(12) United States Patent
Hoesl

(10) Patent No.: US 8,756,655 B2
(45) Date of Patent: Jun. 17, 2014

(54) INTEGRATED PHYSICAL ACCESS CONTROL AND INFORMATION TECHNOLOGY (IT) SECURITY

(75) Inventor: Mark J. Hoesl, Friendswood, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/548,789

(22) Filed: Jul. 13, 2012

(65) Prior Publication Data
US 2014/0020056 A1  Jan. 16, 2014

(51) Int. Cl.
*H04L 9/32* (2006.01)
(52) U.S. Cl.
USPC ............................. 726/2; 726/3; 726/4; 726/5
(58) Field of Classification Search
USPC ............ 726/1–10, 16–21; 713/168–170, 182, 713/186
See application file for complete search history.

(56) References Cited

U.S. PATENT DOCUMENTS

| | | | |
|---|---|---|---|
| 7,316,030 B2 * | 1/2008 | Audebert et al. | 726/14 |
| 7,380,279 B2 | 5/2008 | Prokupets et al. | |
| 7,437,755 B2 | 10/2008 | Farino et al. | |
| 8,091,121 B2 * | 1/2012 | Lioy | 726/5 |
| 2008/0271109 A1 | 10/2008 | Singh et al. | |
| 2010/0017874 A1 | 1/2010 | Piccinini et al. | |

FOREIGN PATENT DOCUMENTS

JP     2008046724 A     2/2008

OTHER PUBLICATIONS

Amazon Cloud Front Developer Guide, API Verison May 5, 2012. Copyright 2012 Amazon Web Services, LLC, 229 pages.

\* cited by examiner

*Primary Examiner* — Hosuk Song
(74) *Attorney, Agent, or Firm* — Andrea Bauer Keohane & D Alessandro, PLLC

(57) ABSTRACT

Embodiments described herein provide security for a user integrated technology (IT) account by integrating a facility's physical access controls with its IT security system to provide authorization and access. When a user is granted facility access, his/her accounts are automatically enabled or provisioned via an IT security system. When the user exits the facility, his/her accounts are automatically disabled or de-provisioned via the IT security system. The IT security system maintains the user IT account in a secured state until the user credentials are verified at an access control point to enable access to the user IT account, and returns the user IT account to the secured state after receiving the user credentials at the access control point to disable access to the user IT account. As such, the user IT account is secured when not needed by the user to reduce periods of vulnerability.

15 Claims, 4 Drawing Sheets

INTEGRATED PHYSICAL ACCESS CONTROL AND INFORMATION TECHNOLOGY (IT) SECURITY

TECHNICAL FIELD

This invention relates generally to security in an information technology (IT) environment and, more specifically, to integrating physical access control of a facility with IT security.

BACKGROUND

Security of information, assets, and people is a desired objective. To reduce security risks, it is desirable to only expose authorization/access authority when a user needs it. For example, an employee may work an 8-hour day, yet his/her system access is available around the clock leaving the system unnecessarily vulnerable for 16 hours. In addition, the system shouldn't be left available when an employee is sick, on vacation, on leave, is working from home, at a customer site, at lunch, off on a holiday, running errands, etc. The ratio of need versus idle time drastically skews periods of vulnerability unnecessarily. Unfortunately, these off-peak hours may be considered an opportune time to compromise a system because fewer staff members/employees are present to notice and/or respond to breaches.

Sensitive information can be secured in part by managing access to such information, including access to electronic information, networks, devices associated with networks, and information systems associated therewith. Managing access can include, for example, requiring authentication or access credentials before allowing access to such information, networks, devices, and information systems. Further, many entities maintain security of their physical premises to secure physical assets, information, and people. Security of a physical premises can include, for example, requiring access credentials for access and monitoring the access of individuals to the physical premises. However, challenges can arise with regard to maintaining the security of information (e.g., electronic information), networks, associated devices, and information systems, while still facilitating access at the appropriate time to such information to those persons or entities that require it. Current approaches lack an effective solution for integrating physical access control and IT security to reduce security risks.

SUMMARY

In general, embodiments of the invention provide an approach for integrated physical access control and IT security. A further layer of security is added to a facility by integrating the facility's physical access controls with its IT security system to provide authorization and access. Specifically, when a user is granted facility access, his/her accounts are automatically enabled or provisioned via an IT security system. When the user exits the facility, his/her accounts are automatically disabled or de-provisioned via the IT security system. The IT security system maintains the user IT account in a secured state until the user credentials are verified at an access control point to enable access to the user IT account, and returns the user IT account to the secured state after receiving the user credentials at the access control point to disable access to the user IT account. As such, the user IT account is secured when not needed by the user to reduce periods of vulnerability.

One aspect of the present invention includes a method for integrating physical access control and Information technology information technology (IT) security, comprising the computer-implemented steps of: receiving a first instance of user credentials at an access control point of a secured area; verifying the user credentials to enable access to a user IT account; providing access to the user IT account; and receiving a second instance of the user credentials from the authentication device at the access control point to disable access to the user IT account.

Another aspect of the present invention provides a system for integrated physical access control and information technology (IT) security, the system comprising: a memory medium comprising instructions; a bus coupled to the memory medium; and a processor coupled to an IT security system via the bus that when executing the instructions causes the system to: receive user credentials at an access control point of a facility; verify the user credentials to authorize access to a user IT account; and subsequently receive the user credentials at the access control point to disable access to the user IT account.

Another aspect of the present invention provides a computer-readable storage medium storing computer instructions, which, when executed, enables a computer system to provide integrated physical access control and information technology (IT) security, the computer instructions comprising: receiving user credentials at an access control point of a facility; verifying the user credentials to enable access to a user IT account; providing access to the user IT account; and subsequently receiving the user credentials from the authentication device at the access control point to disable access to the user IT account.

Another aspect of the present invention provides a method for integrating physical access control and information technology (IT) security, the method comprising: receiving, by a computer system, user credentials of a user at an access control point of a facility; verifying, by the computer system, the user credentials to enable access to a user IT account; providing, by the computer system, access to the user IT account; and subsequently receiving, by the computer system, the user credentials at the access control point to disable access to the user IT account.

Figure 1:
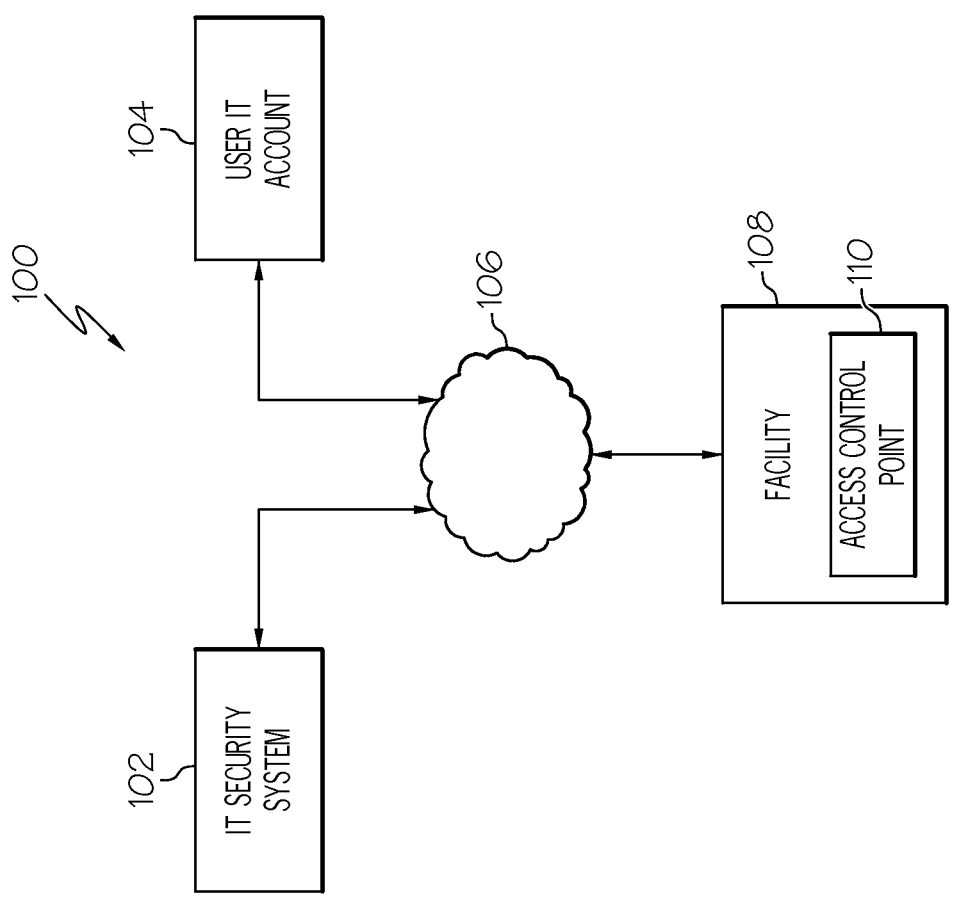
FIG. 1 shows a pictorial representation of a network in which aspects of the illustrative embodiments may be implemented.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments now will be described more fully herein with reference to the accompanying drawings, in which exemplary embodiments are shown. Embodiments of the invention provide security for user IT accounts by integrating a facility's physical access controls with its IT security system to provide authorization and access. Specifically, when a user is granted facility access, his/her accounts are automatically enabled or provisioned via an IT security system. When the user exits the facility, his/her accounts are automatically disabled or de-provisioned via the IT security system. The IT security system maintains the user IT account in a secured state until the user credentials are verified at an access control point to enable access to the user IT account, and returns the user IT account to the secured state after receiving the user credentials at the access control point to disable access to the user IT account. As such, the user IT account is secured when not needed by the user to reduce periods of vulnerability.

It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. For example, as used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

With reference now to the figures, FIG. 1 depicts a system 100 that facilitates management of access to a user IT account or sub-components of the user IT account. System 100 can include an IT security system 102 that can comprise one or more servers for managing access to information stored in one or more storage components (not shown) connected to a network 106. One or more computers can be employed to implement the functions of IT security system 102, for example. IT security system 102 can receive access requests to a user IT account 104 associated with one or more users and/or one or more authentication devices (e.g. a badge, RFID, bar code, etc.). IT security system 102 can also communicate information associated with one or more facilities 108 and access points 110 (e.g., security stations, monitored areas, secured doors, etc., as can be observed by readers, keypads, sensors, and the like). As will be further described herein, IT security system 102 maintains user IT account 104 in a secured state (i.e., locked-down) until user credentials from access control point 110 are verified to enable access to user IT account 104, and returns user IT account 104 to the secured state after receiving the user credentials at access control point 110 to disable access to user IT account 104.

System 100 contains network 106, which is the medium used to provide communications links between each component. Network 106 may include connections, such as wire, wireless communication links, fiber optic cables, etc. System 100 also may be implemented as a number of different types of networks, such as, for example, an intranet, a local area network (LAN), or a wide area network (WAN). It will be appreciated that FIG. 1 is intended as an example, and not as an architectural limitation for different embodiments.

Figure 2:
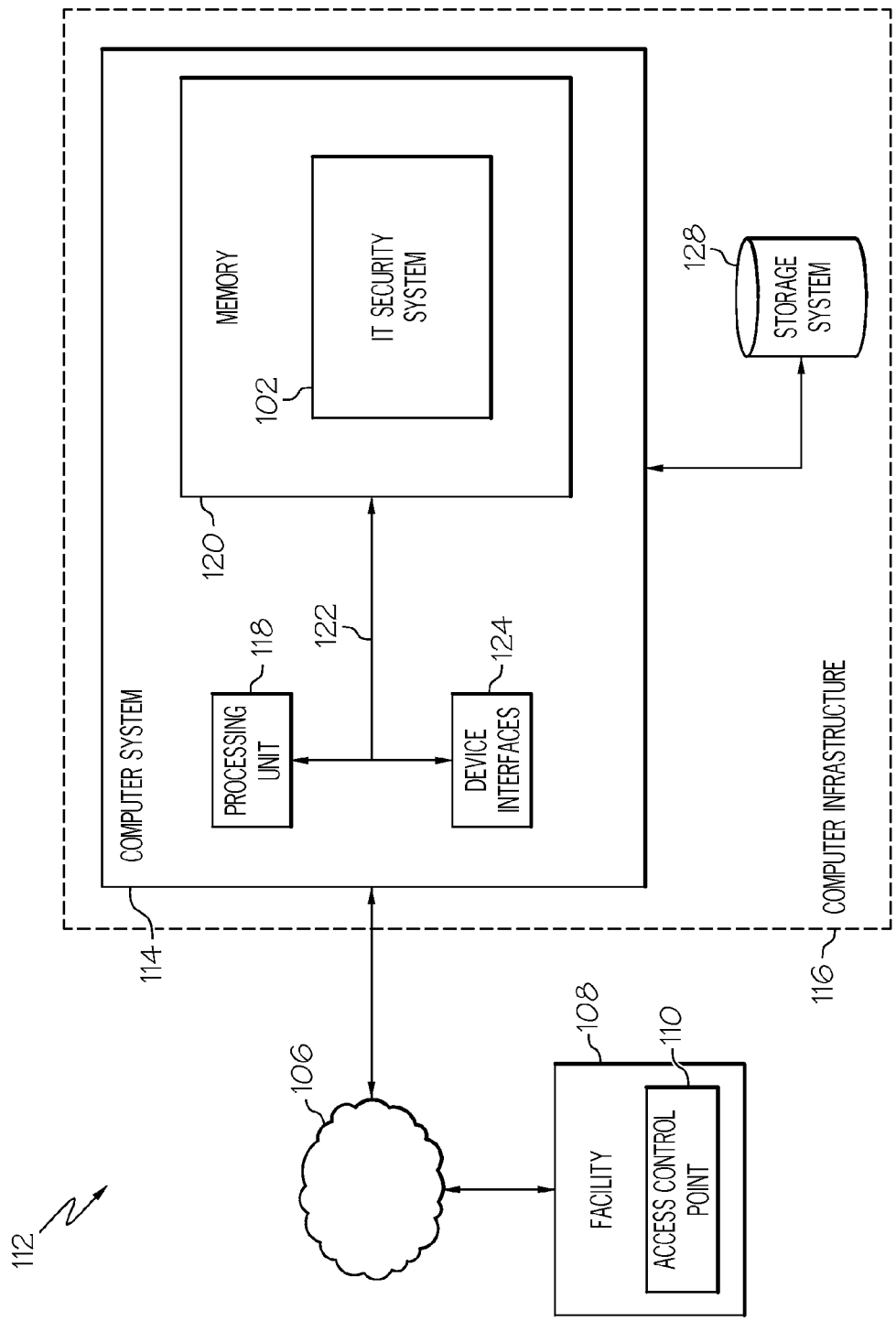
FIG. 2 shows a schematic of an exemplary computing environment according to illustrative embodiments.

Referring now to FIG. 2, a computerized implementation 112 of exemplary embodiments will be described in greater detail. As depicted, implementation 112 includes computer system 114 deployed within a computer infrastructure 116. This is intended to demonstrate, among other things, that embodiments can be implemented within network environment 106 (e.g., the Internet, a wide area network (WAN), a local area network (LAN), a virtual private network (VPN), etc.), or on a stand-alone computer system. Still yet, computer infrastructure 116 is intended to demonstrate that some or all of the components of implementation 112 could be deployed, managed, serviced, etc., by a service provider who offers to implement, deploy, and/or perform the functions of the present invention for others.

Computer system 114 is intended to represent any type of computer system that may be implemented in deploying/realizing the teachings recited herein. In this particular example, computer system 114 represents an illustrative system for providing enhanced IT security. It should be understood that any other computers implemented under various embodiments may have different components/software, but will perform similar functions. As shown, computer system 114 includes a processing unit 118 capable of operating with IT security system 102 stored in a memory unit 120 to provide integrated physical access control and IT security, as will be described in further detail below. Also shown is a bus 122, and device interfaces 124.

Processing unit 118 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 118 receives user credential information from access point 110 of facility 108 and communicates it to IT security system 102. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 118 executes computer program code, such as program code for operating IT security system 102, which is stored in memory unit 120 and/or storage system 128. While executing computer program code, processing unit 118 can read and/or write data to/from memory unit 120 and storage system 128. Storage system 128 can include VCRs, DVRs, RAID arrays, USB hard drives, optical disk recorders, flash storage devices, and/or any other data processing and storage elements for storing and/or processing data. Although not shown, computer system 114 could also include I/O interfaces that communicate with one or more hardware components of computer infrastructure 116 that enable a user to interact with computer system 114 (e.g., a keyboard, a display, camera, etc.).

Figure 3:
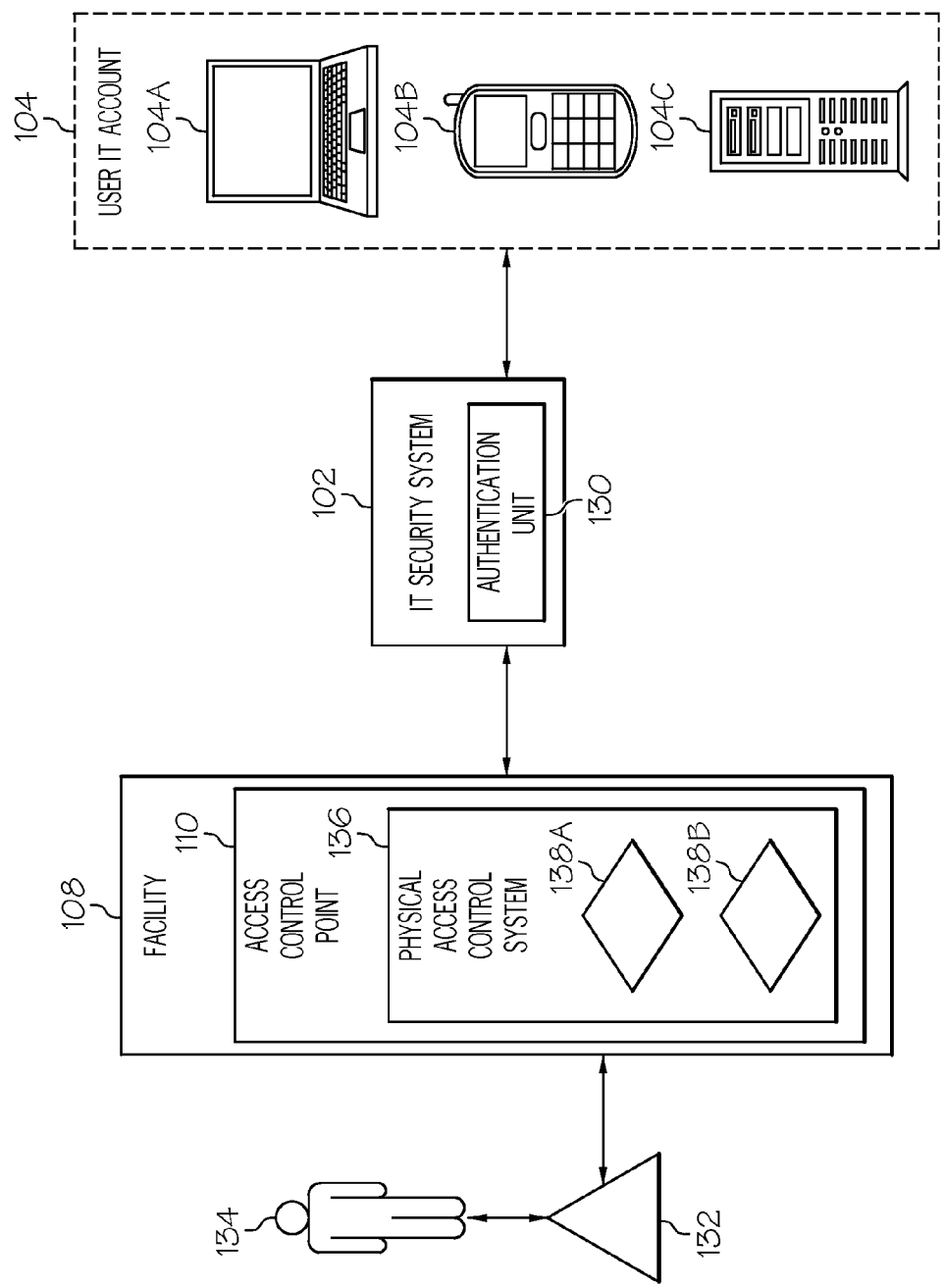
FIG. 3 shows an architecture in which integrated physical access control and IT security is implemented according illustrative embodiments.

Referring now to FIG. 3, the structure and operation of IT security system 102, user IT account 104, and access control point 110 of facility 108 according to exemplary embodiments will be described in greater detail. As illustrated, IT security system 102 comprises an authentication unit 130 configured to receive user credentials 132 from a user 134 at access control point 110 of a secured area (i.e., facility 108 or an area within facility 108), and verify user credentials 132 to enable authorize access to user IT account 104. In one embodiment, authentication unit 130 can reference table(s) and/or list(s) that can include information associated with IT network access, such as network access credential information, network access policies, and information associated with physical access, such as physical access credential information and physical access policies of access control point 110 for user 134. Authentication unit 130 validates a first request by user 134 to enable access to user IT account 104 concurrent with physical access at access control point 110, as well as a subsequent request from user 134 to re-authenticate, which returns user IT account 104 to a secured state. IT security system 102 and authentication unit 130 can facilitate enforcement of user IT account 104 access policies as it pertains to each respective user.

IT security system 102 communicates with a physical access control system 136 of access control point 110 to provide physical access credential information associated with respective users and the physical access policy associated with the access control point 110 of facility 108. Physical access control system 136 can include one or more servers (not shown) that can manage user credentials, physical access policy, and physical access operation. Physical access control system 136 can provide IT security system 102 with updates or revisions to physical access credentials and the physical access policy, as physical access control system 136 can facilitate managing user physical access credentials, including new and expired physical access credentials. Physical access control system 136 also can manage and facilitate enrollment of new physical authentication devices, such as badges and key cards, which may be part of physical access control system 136.

In exemplary embodiments, physical control system 136 includes one or more access readers 138A and 138B, which may comprise, for example, card readers, biometric readers, keypads, electromechanical locks, physical location/motion sensors, etc. Access readers 138A and 138B may comprise card or badge readers that can scan cards or badges, whereby such cards or badges include user credentials 132, and such credentials can be analyzed by authentication unit 130 and compared to credential information on file to determine whether a particular user can be granted access at facility 108, or a particular area therein. Biometric readers can scan and analyze physical attributes of user 134, such as fingerprint, retina, facial features, and information associated with one or more of these physical attributes can be utilized to determine whether user 134 can be granted physical access to facility 108, or some area therein. Keypads can be utilized to require user 134 to enter an appropriate password before access can be granted at access control point 110.

Physical access control system 136 makes access decisions responsive to data from access readers 138A and 138B for controlling, e.g., locking mechanisms to doors accessing areas of facility 108. In one embodiment, access readers 138A and 138B may be positioned on both sides of a locked door for controlling ingress/egress. Physical control system 136 can be network-capable to communicate information via a frame/packet network, and/or communication of information with authentication unit 130 of IT security system 102 and/or between access readers 138A and 138B.

During operation, when user 134 attempts to gain access to facility 108 via access control point 110, IT security system 102 receives user credentials 132 from the authentication device. Authentication unit 130 references IT access information associated with user 134, including information regarding IT access credentials, IT access event information (e.g., log in events, resources accessed, etc.), and/or network access policies. Further, authentication unit 130 receives location-based access information associated with the user from physical access control system 136. Such physical log-in location information can include information provided by location sensors, for example, and/or physical access information, such as physical access credentials, physical access policies, and/or physical access event information. If authentication 130 verifies user credentials 132, user 134 is granted entrance through access control point 110 and user IT account 104 is enabled. However, if user credentials 132 are not verified, access is denied and user IT account is not enabled. Optionally, an alert may be generated indicating the failed user credential verification.

Once user IT account 104 is enabled, the identity of user 134 is verified (e.g., via a username/password log-in at a user terminal) to provide access to user IT account 104, which may operate on any number or combination of multiple disparate systems, e.g., computer 104A, mobile device 104B, and server 104C). User 134 may then operate normally, with access to user IT account 104 as determined by IT security system 102. In the event that user 134 again passes through access control point 110 of facility 108, for example, at the end of the work day or for lunch, user credentials 132 are received at physical control system 136 and sent to IT security system 102 to disable access to user IT account 104. Specifically, IT security system 102 receives a second instance of user credentials 132 for user 134 from an authentication device operating with physical control system 136 of facility 108. After receiving the second instance of user credentials 132, User IT account 104 is locked-down (e.g., returned to a more secured state or disabled) where it is maintained until user credentials 132 are verified at physical control system 136 to enable access to user IT account 104.

For a given operating system (OS), the following are non-limiting commands to enable and disable access to User IT account 104 of user 134.
Windows®:
Net user UserID/active:no
Net user UserID/active:yes
Linux®:
passwd-l UserID where L stands for Lock
passwd-u UserID where U stands for Unlock
Unix® (AIX):
chuser account_locked=true UserID
chuser account_locked=true UserID IT security system 102 may invoke these commands directly or access the corresponding OS APIs. This leaves the security settings intact but makes them unusable by disabling the User Logon, which would be required to put the security settings into effect. For an OS without this capability, user IDs could be provisioned or deprovisioned by executing a script that creates and removes UserIDs and their associated security settings on the fly. The same logic exists on on-boarding and off-boarding of user access to technology assets (HW, SW and Services) when an employee is hired or terminated. (Windows® is a registered trademark of Microsoft Corporation. Linux® is a registered trademark of Linus Torvalds. Unix® is a registered trademark of The Open Group.).

In other embodiments, user 134 is provided with remote access to user IT account 104. To enable remote access, an IT help desk, IT security administrator, automated system etc., receives user credentials and validates the identity of user 134 to grant access to user IT account 104. Alternatively, user 134 may schedule and pre-authorize future remote access to user IT account 104 while presently logged in. In an automated approach, IT security system 102 and authentication unit 130 are configured to receive user credentials 132 from user 134 located remote to facility 108 for access to user IT account 104 according to a set of predefined conditions. For example, access may be granted for a specific time frame, or until user 134 logs off from his/her account or a specific application. Authentication unit 130 can reference IT access information associated with user 134, including information regarding IT access credentials, IT access event information (e.g., log in events, resources accessed, etc.), and/or network access policies. Once user 134 has access to user IT account 104, user 134 may operate normally, with access to user IT account 104 according to the set of predefined conditions. Access to User IT account 104 continues until one of the predefined conditions is met, e.g., time out, log-out, etc., whereby User IT account 104 is locked-down (i.e., returned to a more secured state that may not be accessed by user 134). IT system remains in a secured state until user credentials 132 are again verified to enable access to user IT account 104.

It can be appreciated that embodiments disclosed herein are not limited to a single user and associated user IT account. Rather, IT security system 102 can generate and enforce IT security measures for any number of users. IT security system 102 can generate IT control policies that govern account access by respective users disposed in network 106, and can enforce such polices.

In another embodiment, verification of one user (e.g., manager, supervisor, IT employee) at an access control point enables access for a plurality of user IT accounts. For example, when an indication is received from physical control system 136 that an IT supervisor has been verified at access control point 110 (e.g., by use of badge at a reader of physical control system 136), IT security system 102 enables IT account access to any number of employees reporting to, or selected by, the IT supervisor. As a result, each user IT account is enabled, allowing each previously verified employee to input identification credentials at his/her workstation and log-in. Similarly, when an indication is received from physical control system 136 that the IT supervisor has been subsequently verified at access control point 110 (e.g., when leaving facility 108), IT security system 102 disables IT account access to the employees within facility 108 previously enabled access by virtue of the IT supervisors initial verification. Thus, an additional layer of security is provided because access by the IT supervisor in facility 108, as well as each employee, is required to enable each respective IT user account.

It can be appreciated that the approaches disclosed herein can be used within a computer system to provide integrated physical access control and IT security. In this case, IT security system 102 can be provided, and one or more systems for performing the processes described in the invention can be obtained and deployed to computer infrastructure 116. To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 114 may be described in the general context of computer-executable instructions, such as program modules, being executed by a computer. Generally, program modules include routines, programs, people, components, logic, data structures, and so on, that perform particular tasks or implement particular abstract data types. Exemplary computer system 114 may be practiced in distributed computing environments where tasks are performed by remote processing devices that are linked through a communications network. In a distributed computing environment, program modules may be located in both local and remote computer storage media including memory storage devices.

Figure 4:
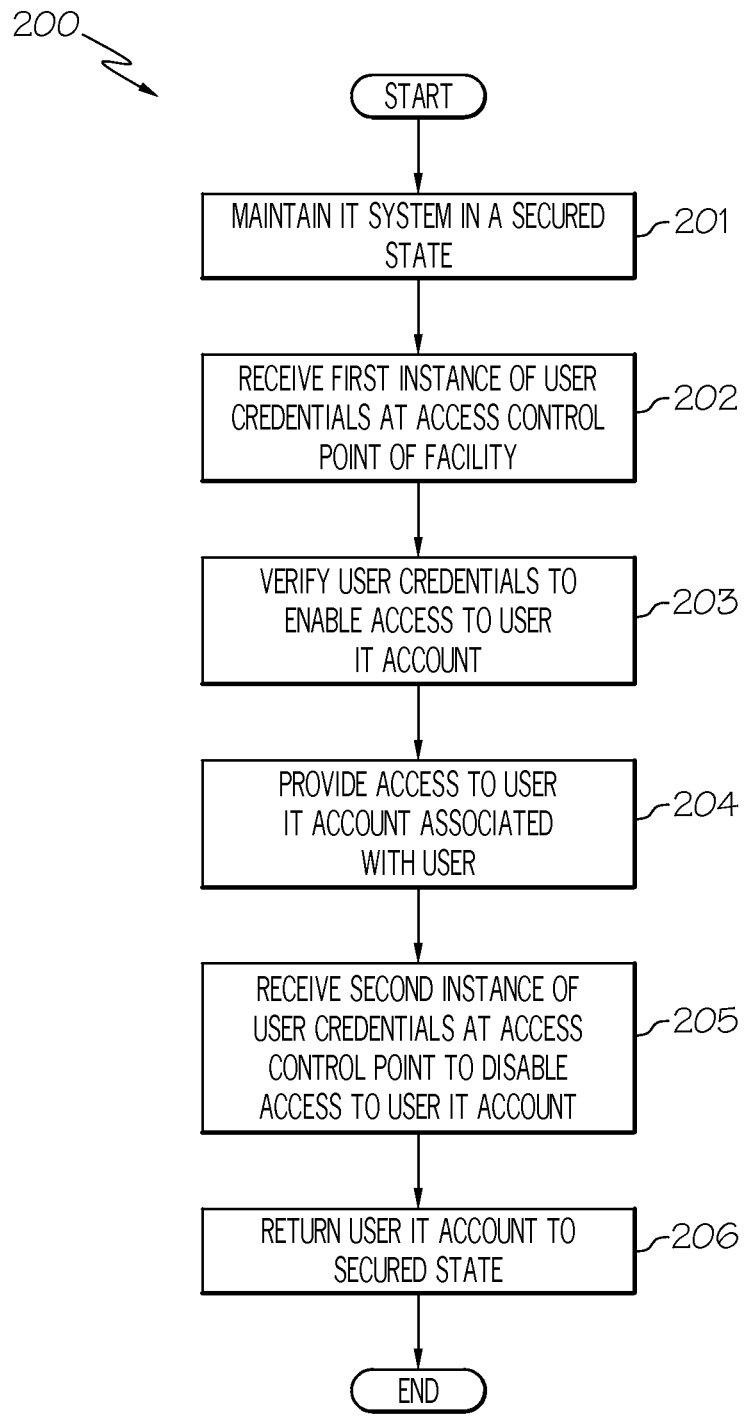
FIG. 4 shows a process flow for integrating physical access controls and IT security according to illustrative embodiments.

As depicted in FIG. 4, computer system 114 carries out the methodologies disclosed herein. Shown is a method 200 for integrated physical access control and IT security. At 201, the user IT account is maintained in a secured state until user credentials are verified to enable access to the user IT account. At 202, a first instance of user credentials from a user is received at the access control point of the facility. At 203, the user credentials are verified to enable access to the user IT account. At 204, access to the user IT account is provided, e.g., following username/password verification at a user workstation/terminal. At 205, a second instance of the user credentials is received at the access control point to disable access to the user IT account. Finally, at 206, the user IT account is returned to the secured state after receiving the second instance of user credentials at the access point, and the process ends.

The flowchart of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function (s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, as will be described herein, systems/units may also be implemented as a combination of software and one or more hardware devices. For instance, a IT security system 102 and authentication unit 130 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

For example, an implementation of exemplary computer system 114 (FIG. 2) may be stored on or transmitted across some form of computer-readable storage medium. Computer-readable storage medium can be media that can be accessed by a computer. "Computer-readable storage medium" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication medium" typically embodies computer readable instructions, data structures, and program modules. Communication media also includes any information delivery media.

It is apparent that there has been provided an approach for structured communication for automated data governance. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for integrating physical access control and information technology (IT) security, the method comprising:
   receiving a first instance of user credentials from an authentication device at an access control point of a secured area, wherein the access control point comprises a physical access control system;
   verifying, by at least one computing device, the user credentials to enable access to a user IT account;
   providing, by at least one computing device, access to the user IT account; and
   receiving a second instance of the user credentials from the authentication device at the access control point to disable access to the user IT account.

2. The method according to claim 1, further comprising:
   maintaining, by at least one computing device, the user IT account in a secured state until the user credentials are verified to enable access to the user IT account; and
   returning, by at least one computing device, the user IT account to the secured state after receiving the second instance of the user credentials at the access control point.

3. The method according to claim 1, further comprising verifying, by at least one computing device, an identity of a user to provide access to the user IT account.

4. The method according to claim 1, wherein receiving the first instance of user credentials further comprises receiving the user credentials from a user located remote to the secured area.

5. A system for integrated physical access control and information technology (IT) security, the system comprising:
   a memory medium comprising instructions;
   a bus coupled to the memory medium; and
   a processor coupled to an IT security system via the bus that when executing the instructions causes the system to:
   receive user credentials from an authentication device at an access control point of a secured area, wherein the access control point comprises a physical access control system;
   verify the user credentials to enable access to a user IT account;
   provide access to the user IT account; and
   subsequently receive the user credentials from the authentication device at the access control point to disable access to the user IT account.

6. The system according to claim 5, further comprising instructions causing the system to:
   maintain the user IT account in a secured state until the user credentials are verified to enable access to the user IT account; and
   return the user IT account to the secured state after receiving the user credentials at the access control point.

7. The system according to claim 5, further comprising instructions causing the system to verify an identity of a user to provide access to the user IT account.

8. The system according to claim 5, the instructions causing the system to receive the user credentials at the access control point comprising instructions causing the system to receive the user credentials from a user located remote to the facility.

9. A computer-readable storage device storing computer instructions, which when executed, enables a computer system to provide integrated physical access control and information technology (IT) security, the computer instructions comprising:
receiving user credentials from an authentication device at an access control point of a secured area, wherein the access control point comprises a physical access control system;
verifying the user credentials to enable access to a user IT account;
providing access to the user IT account; and
subsequently receiving the user credentials from the authentication device at the access control point to disable access to the user IT account.

10. The computer-readable storage device according to claim 9 further comprising computer instructions for:
maintaining the user IT account in a secured state until the user credentials are verified to enable access to the user IT account; and
returning the user IT account to the secured state after subseqently receiving the user credentials at the access control point.

11. The computer-readable storage device according to claim 9 further comprising computer instructions for verifying an identity of a user to provide access to the user IT account.

12. The computer-readable storage device according to claim 9, the computer instructions for receiving the user credentials comprising receiving the user credentials from a user located remote to the facility.

13. A method for providing integrated physical access control and information technology (IT) security, the method comprising:
receiving, by a computer system, user credentials of a user from an authentication device at an access control point of a facility, wherein the access control point comprises a physical access control system;
verifying, by the computer system, the user credentials to enable access to a user IT account;
providing, by the computer system, access to the user IT account; and
subsequently receiving, by the computer system, the user credentials from the authentification device at the access control point to disable access to the user IT account.

14. The method according to claim 13, further comprising:
maintaining, by the computer system, the user IT account in a secured state until the user credentials are verified to enable access to the user IT account; and
returning, by the computer system, the user IT account to the secured state after subsequently receiving the user credentials at the access control point.

15. The method according to claim 13, the receiving comprising receiving, by the computer system, the user credentials from a user located remote to the secured area.

* * * * *